US012690078B2

(12) United States Patent
Kubota et al.

(10) Patent No.: US 12,690,078 B2
(45) Date of Patent: Jul. 21, 2026

(54) WIRELESS COMMUNICATION SYSTEM, RELAY APPARATUS, AND WIRELESS COMMUNICATION METHOD

(71) Applicants: Syuji Kubota, Tokyo (JP); Mayuko Ueno, Chiba (JP)

(72) Inventors: Syuji Kubota, Tokyo (JP); Mayuko Ueno, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 299 days.

(21) Appl. No.: 18/628,066

(22) Filed: Apr. 5, 2024

(65) Prior Publication Data

US 2024/0365406 A1      Oct. 31, 2024

(30) Foreign Application Priority Data

Apr. 28, 2023    (JP) ................................. 2023-074992

(51) Int. Cl.
*H04B 7/14*       (2006.01)
*H04W 76/11*      (2018.01)
*H04W 88/04*      (2009.01)

(52) U.S. Cl.
CPC ............ *H04W 76/11* (2018.02); *H04W 88/04* (2013.01)

(58) Field of Classification Search
CPC ..... H04W 76/11; H04W 88/04; H04W 16/26; Y02D 30/70; H04B 7/2606; H04B 7/155; H04L 2001/0097
See application file for complete search history.

(56) References Cited

U.S. PATENT DOCUMENTS

| | | | | |
|---|---|---|---|---|
| 9,350,654 B1 * | 5/2016 | Gredler | ................. | H04L 45/507 |
| 2005/0185625 A1 * | 8/2005 | Sakaguchi | .......... | H04L 61/5007 |
| | | | | 370/338 |

(Continued)

FOREIGN PATENT DOCUMENTS

| | | |
|---|---|---|
| JP | H09-083528 | 3/1997 |
| JP | 4269789 | 5/2009 |

(Continued)

*Primary Examiner* — Phuongchau Ba Nguyen
(74) *Attorney, Agent, or Firm* — IPUSA, PLLC

(57) ABSTRACT

A wireless communication system includes a terminal apparatus that transmits data to a communication apparatus via a communication network, and at least one relay apparatus that communicates with the communication apparatus and the terminal apparatus. The terminal apparatus executes acquiring first identification information identifying the communication apparatus, second identification information identifying the terminal apparatus, and third identification information identifying the relay apparatus; transmitting the data including the first and second identification information to the communication apparatus; and transmitting, to the relay apparatus, the data including the third and second identification information when response data is not received from the communication apparatus. The relay apparatus executes acquiring first identification; and rewriting the third identification information included in the data with the acquired first identification information and transmitting the data to the communication apparatus, upon receiving data including third and second identification information from the terminal apparatus.

8 Claims, 13 Drawing Sheets

(56)        References Cited

U.S. PATENT DOCUMENTS

| | | | |
|---|---|---|---|
| 2012/0224569 A1* | 9/2012 | Kubota | H04W 84/20 |
| | | | 370/338 |
| 2013/0172034 A1 | 7/2013 | Kubota | |
| 2014/0051349 A1 | 2/2014 | Watanabe et al. | |
| 2015/0103746 A1* | 4/2015 | Matsushima | H04L 69/22 |
| | | | 370/328 |
| 2016/0295453 A1 | 10/2016 | Minamiyama et al. | |
| 2017/0134535 A1* | 5/2017 | Osamura | H04L 69/16 |
| 2019/0174449 A1* | 6/2019 | Shan | H04W 60/04 |
| 2023/0137778 A1* | 5/2023 | Wen | H04L 45/566 |
| | | | 709/238 |

FOREIGN PATENT DOCUMENTS

| | | |
|---|---|---|
| JP | 2015-033112 | 2/2015 |
| JP | 2015-211273 | 11/2015 |
| JP | 2015-226138 | 12/2015 |
| JP | 2016-009929 | 1/2016 |
| JP | 6206741 | 10/2017 |
| JP | 6384785 | 9/2018 |
| JP | 6399432 | 10/2018 |
| JP | 6508594 | 5/2019 |

* cited by examiner

| RELAY APPARATUS ID | COMMON ID | TERMINAL APPARATUS ID THAT IS RELAY TARGET |
|---|---|---|
| 31 | 30 | 22 |

| RELAY APPARATUS ID | COMMON ID | TERMINAL APPARATUS ID THAT IS RELAY TARGET |
|---|---|---|
| 32 | 30 | 21 |

~1101b

WIRELESS COMMUNICATION SYSTEM, RELAY APPARATUS, AND WIRELESS COMMUNICATION METHOD

CROSS-REFERENCE TO RELATED APPLICATION

The present application is based on and claims priority under 35 U.S.C. § 119 to Japanese Patent Application No. 2023-074992, filed on Apr. 28, 2023, the contents of which are incorporated herein by reference in their entirety.

BACKGROUND OF THE INVENTION

1. Field of the Invention

The present disclosure relates to a wireless communication system, a relay apparatus, and a wireless communication method.

2. Description of the Related Art

For example, a wireless sensor network, which is a communication technology for smart meters, HEMS (Home Energy Management System), or BEMS (Building Energy Management System), etc., is known.

A wireless network system is known in which the base station node does not request the responder unit node to transmit data, the base station node receives the data transmitted by the responder unit node, and the base station node transmits the data to the server in response to a request from the server (see, e.g., Patent Document 1).

Patent Document 1: Japanese Unexamined Patent Application Publication No. 2015-33112

SUMMARY OF THE INVENTION

According to one aspect of the present invention, there is provided a wireless communication system including a terminal apparatus configured to transmit data to a communication apparatus via a communication network; and at least one relay apparatus configured to communicate with the communication apparatus and the terminal apparatus by the communication network, wherein the terminal apparatus includes:

first circuitry; and a first memory storing computer-executable instructions that cause the first circuitry to execute:

acquiring first identification information identifying the communication apparatus, second identification information identifying the terminal apparatus, and third identification information identifying the at least one relay apparatus in the communication network; and transmitting the data including the first identification information and the second identification information to the communication apparatus, wherein the transmitting includes transmitting, to the relay apparatus, the data including the third identification information and the second identification information in response to determining that response data is not received from the communication apparatus, the response data being data indicating that the communication apparatus has received the data, and wherein the relay apparatus includes:

second circuitry; and a second memory storing computer-executable instructions that cause the second circuitry to execute:

acquiring the first identification information identifying the communication apparatus; and relaying the data from the terminal apparatus by rewriting the third identification information included in the data with the acquired first identification information and transmitting the rewritten data to the communication apparatus, in response to receiving the data including the third identification information and the second identification information from the terminal apparatus.

BRIEF DESCRIPTION OF THE DRAWINGS

FIG. 5 is a diagram illustrating an example of a hardware configuration of a computer according to an embodiment of the present invention;

FIGS. 11A and 11B are diagrams illustrating an image of a relay target list according to according to the third embodiment of the present invention;

DESCRIPTION OF THE EMBODIMENTS

In a wireless communication system in which a terminal apparatus (responder device node) transmits data to a communication apparatus (base station node) by wireless communication, for example, after the terminal apparatus and the communication apparatus are installed, the terminal apparatus may become unable to communicate with the communication apparatus due to changes in the radio wave environment or the like. In such a case, there is demand for the communication apparatus and a relay apparatus capable of communicating with the terminal apparatus to relay wireless communication between the terminal apparatus and the communication apparatus, to be installed.

However, in the conventional technology, there is a problem that in order to enable the terminal apparatus that can no longer communicate with the communication apparatus to communicate with the communication apparatus via the relay apparatus, the setting of the terminal apparatus that can no longer communicate with the communication apparatus must be changed in order to communicate with the relay apparatus.

A problem to be addressed by an embodiment of the present invention is to enable the terminal apparatus to transmit data to the communication apparatus via the relay apparatus without changing the setting of the terminal apparatus that can no longer transmit data to the communication apparatus.

An embodiment of the present invention (the present embodiment) will be described below with reference to the accompanying drawings.

<System Configuration>

Figure 1:
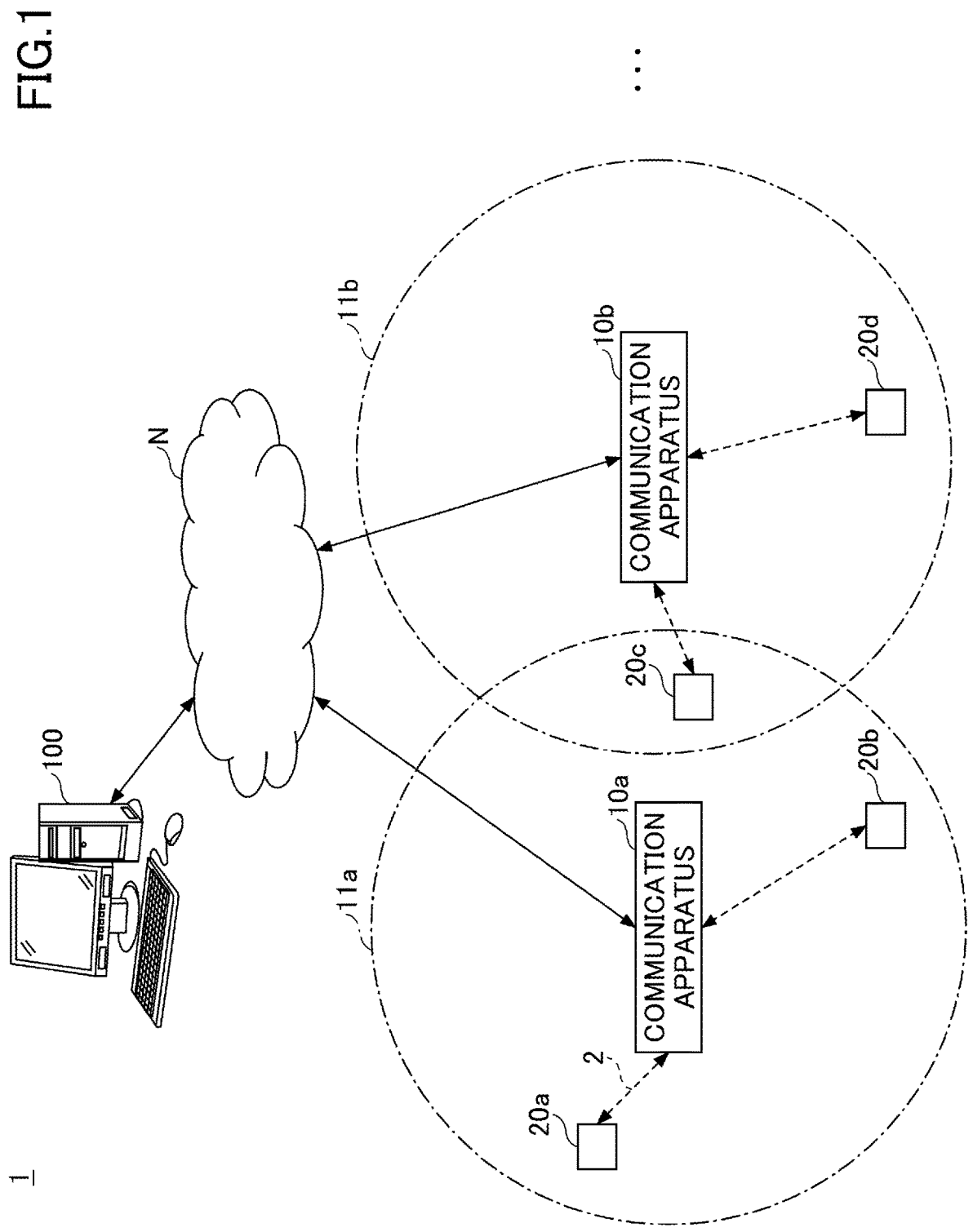
FIG. 1 is a diagram (1) illustrating an example of a system configuration of a wireless communication system according to an embodiment of the present invention.
Figure 2:
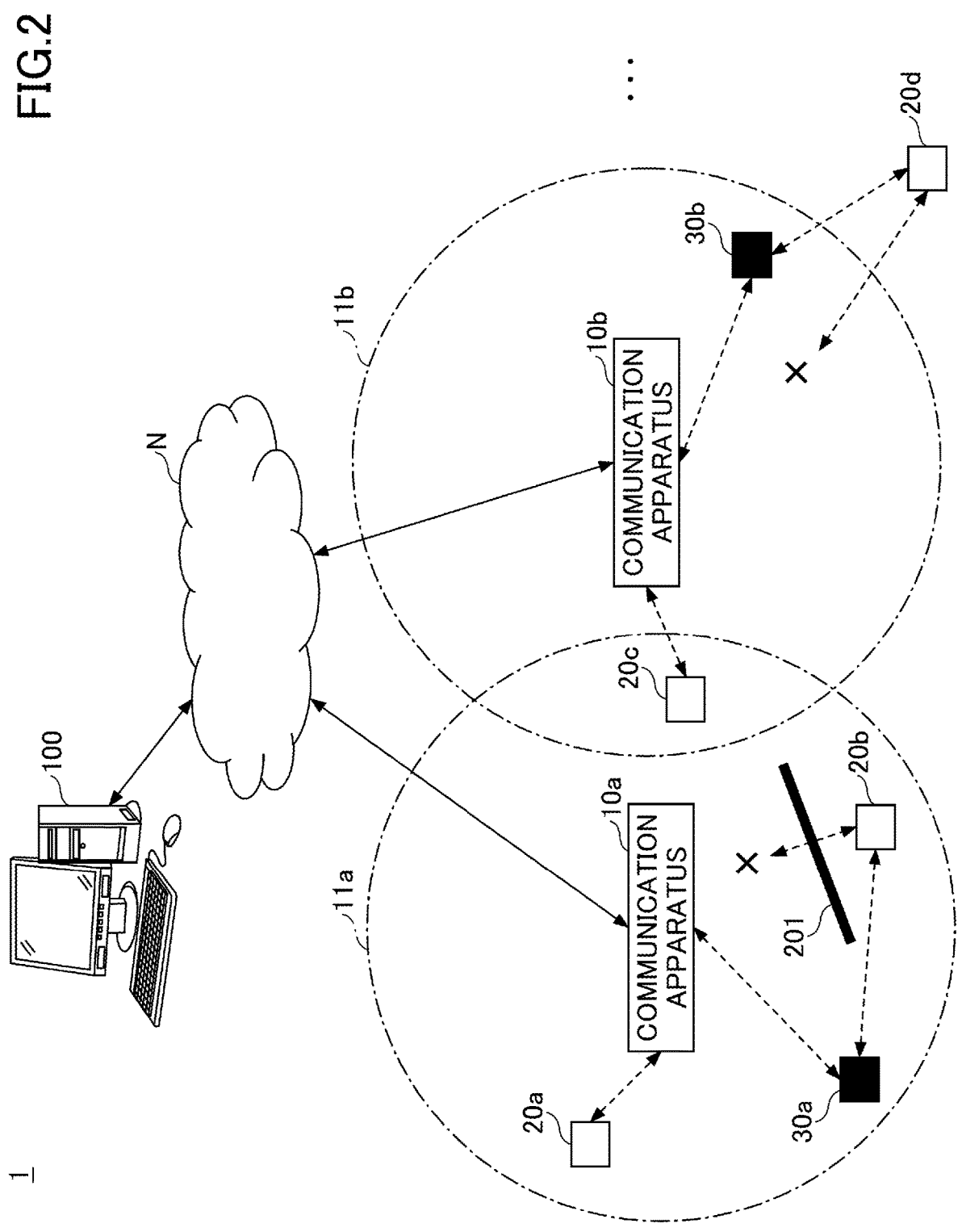
FIG. 2 is a diagram (2) illustrating an example of a system configuration of a wireless communication system according to an embodiment of the present invention.

FIGS. 1 and 2 are diagrams illustrating an example of a system configuration of a wireless communication system according to an embodiment. In the example of FIG. 1, a wireless communication system 1 includes communication apparatuses 10a, 10b, . . . , terminal apparatuses 20a, 20b, 20c, 20d, . . . , and a management server 100. In the following description, when any communication apparatus among communication apparatuses 10a, 10b, . . . , is referred to, the communication apparatus will be referred to as the "communication apparatus 10". When any terminal apparatus among terminal apparatuses 20a, 20b, 20c, 20d, . . . , is referred to, the terminal apparatus will be referred to as the "terminal apparatus 20".

In the example of FIG. 1, the communication apparatuses 10a, 10b, . . . , are communicatively connected to the management server 100 via a communication network N such as the Internet and a LAN (Local Area Network). In the present embodiment, the management server 100 may be a server external to the wireless communication system 1 or a cloud system.

The terminal apparatus 20 is a wireless terminal that transmits data to the communication apparatus 10 by wireless communication. As a specific example, the terminal apparatus 20 is a sensor terminal that connects to the communication apparatus 10 by the wireless communication 2 such as LPWA (Low Power Wide Area) and transmits sensor data acquired from a sensor connected to (or incorporated in) the terminal apparatus 20 to the communication apparatus 10. However, the terminal apparatus 20 is not limited thereto, and the terminal apparatus 20 may be a wireless terminal that transmits data other than sensor data to the communication apparatus 10. The wireless communication 2 is an example of a communication network.

The communication apparatus 10 is a wireless communication apparatus that is connected to the terminal apparatus 20 in a wireless communication area of the communication apparatus 10 so as to be communicable by wireless communication and transmits data received from the terminal apparatus 20 to a management server 100. As a specific example, the communication apparatus 10 is a GW (Gateway) which relays communication between the wireless communication 2 such as LPWA and the communication network N.

The management server 100 is, for example, an information processing apparatus having a computer configuration or a system including a plurality of computers. The management server 100 acquires, for example, data transmitted by the terminal apparatus 20 via the communication apparatus 10, stores the data in a storage unit or the like, and manages the data. Preferably, the management server 100 can set or change the setting information of the terminal apparatus 20 via the communication apparatus 10.

Generally, when a wireless communication network is constructed between the communication apparatus 10 and the terminal apparatus 20, it is necessary to set the setting information required for wireless communication in the communication apparatus 10 and the terminal apparatus 20. Here, the setting information required for communication includes, for example, a wireless channel (frequency), identification information identifying the network (hereinafter referred to as a network ID), a transmission rate, an encryption key, or identification information identifying each device.

Here, it is assumed that the terminal apparatuses 20a and 20b are preset with setting information for performing wireless communication with the communication apparatus 10a, and the terminal apparatuses 20c and 20d are preset with setting information for performing wireless communication with the communication apparatus 10b.

The terminal apparatus 20 transmits data to the communication apparatus 10 by using identification information (hereinafter referred to as a terminal apparatus ID) for identifying the terminal apparatus 20 and identification information (hereinafter referred to as a communication apparatus ID) for identifying the destination communication apparatus 10.

For example, in FIG. 1, the terminal apparatus 20c is in the area of a communication area 11a of the communication apparatus 10a and the communication area 11b of the communication apparatus 10b. Even in this case, the terminal apparatus 20c can selectively perform wireless communication with the communication apparatus 10b by transmitting data including the terminal apparatus ID of the terminal apparatus 20c and the communication apparatus ID of the communication apparatus 10b.

Preferably, the terminal apparatus 20 operates by power supplied from a battery and performs intermittent operations to reduce power consumption. For example, the terminal apparatus 20 acquires sensor data at a preset time interval, a preset time, etc., and transmits the acquired data to the communication apparatus 10 by wireless communication. When the terminal apparatus 20 receives response data (e.g., ACK frame, etc.) indicating that the data has been received from the communication apparatus 10 to which the data has been transmitted, the terminal apparatus 20 causes the communication apparatus 10 to shift to a power-saving state (e.g., a sleep state).

When the communication apparatus 10 shifts to the power-saving state, the communication apparatus 10 operates an internal timer for measuring the timing of acquiring sensor data, and stops the wireless communication function or the like. Accordingly, the communication apparatus 10 cannot receive a packet addressed to the communication apparatus 10 when the communication apparatus 10 has shifted to the power-saving state.

In the wireless communication system 1 as illustrated in FIG. 1, for example, the terminal apparatus 20 may become unable to communicate with the communication apparatus 10 due to a change in the radio wave environment. For example, as illustrated in FIG. 2, when a radio wave blocking object 201 is installed near the terminal apparatus 20b, the radio wave blocking object 201 may block the radio wave from reaching the terminal apparatus 20*b*, and the terminal apparatus 20*b* and the communication apparatus 10*a* may become unable to communicate wirelessly. Alternatively, when the installation position of the terminal apparatus 20*d* is changed to a position within the range of the communication area 11*b* of the communication apparatus 10*b*, the radio wave may not reach the terminal apparatus 20*d* and the communication apparatus 10*b* may become unable to communicate wirelessly.

In such a case, for example, there is demand for a relay apparatus 30*a* capable of communicating with the communication apparatus 10*a* and the terminal apparatus 20*b* to relay wireless communication between the terminal apparatus 20*b* and the communication apparatus 10*a*, to be installed.

However, in the conventional technology, in order to enable the terminal apparatus 20*b*, which is no longer able to communicate with the communication apparatus 10*a*, to communicate with the communication apparatus 10*a* via the relay apparatus 30*a*, the setting of the terminal apparatus 20*b* has to be changed. However, the terminal apparatus 20*b* cannot perform wireless communication with the communication apparatus 10*a*, and, therefore, for example, the setting of the terminal apparatus 20*b* cannot be changed from the management server 100 via the communication apparatus 10*a*.

Accordingly, in the conventional technology, for example, an administrator or the like goes to the place where the terminal apparatus 20*b* is installed, and performs operations such as pairing the terminal apparatus 20*b* with the relay apparatus 30*a*, or setting routing information on the terminal apparatus 20*b*.

Therefore, in the present embodiment, identification information (hereinafter referred to as a common ID) common to one or more relay apparatuses 30 is set in advance in each terminal apparatus 20. When the relay apparatus 30 receives data for which the common ID is set in the destination, for example, the relay apparatus 30 rewrites the destination of the received data with the communication apparatus ID of the communication apparatus 10 and transmits the data to the communication apparatus 10.

Thus, according to the present embodiment, data can be transmitted from the terminal apparatus 20 to the communication apparatus 10 via the relay apparatus 30 without changing the setting of the terminal apparatus 20 that is no longer able to transmit data to the communication apparatus 10.

<Hardware Configuration>

Next, an example of the hardware configuration of each apparatus included in the wireless communication system 1 will be described.

(Hardware Configuration of Communication Apparatus)

Figure 3:
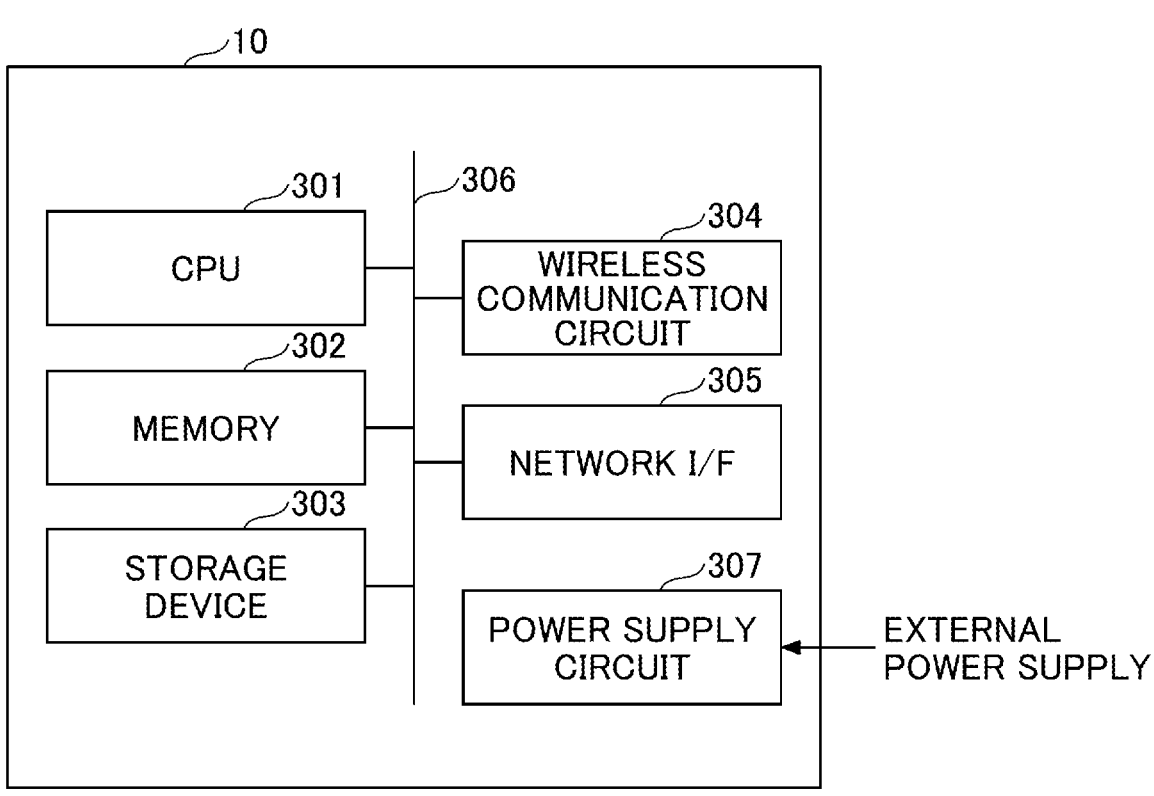
FIG. 3 is a diagram illustrating an example of a hardware configuration of a communication apparatus according to an embodiment of the present invention.

FIG. 3 is a diagram illustrating an example of a hardware configuration of the communication apparatus according to an embodiment. As illustrated in FIG. 3, the communication apparatus 10 includes, for example, a Central Processing Unit (CPU) 301, a memory 302, a storage device 303, a wireless communication circuit 304, a network interface (I/F) 305, a bus 306, and a power supply circuit 307.

The CPU 301 is, for example, an arithmetic unit (processor) that implements each function of the communication apparatus 10 by executing a predetermined program stored in a storage medium such as the storage device 303. The memory 302 includes, for example, a Random Access Memory (RAM) used as a work area of the CPU 301 and a Read Only Memory (ROM) for storing a program for starting the CPU 301. The storage device 303 is a non-volatile, large-capacity storage device for storing, for example, programs and various kinds of data.

The wireless communication circuit 304 includes a wireless circuit, an antenna, a communication control circuit, and the like for performing wireless communication with the terminal apparatus 20. As a specific example, the wireless communication circuit 304 is a wireless communication module or the like conforming to the wireless communication standard of IEEE 802.15.4. However, the wireless communication circuit 304 may perform wireless communication with the terminal apparatus 20 by another wireless communication method. The network I/F 305 is a communication interface for connecting the communication apparatus 10 to the communication network N and performing communication with the management server 100 or the like. The bus 306 is connected to each of the above elements in a shared manner and transmits, for example, address signals, data signals, and various control signals.

The power supply circuit 307 is a power supply circuit that is connected to an external power supply and supplies power to each of the above elements.

(Hardware Configuration of Terminal Apparatus)

Figure 4A:
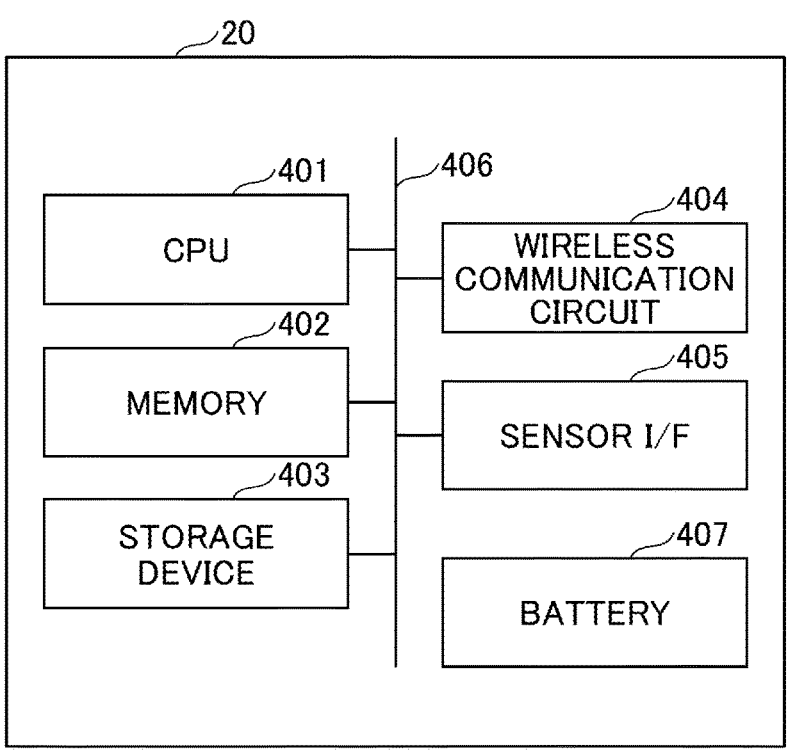
FIGS. 4A and 4B are diagrams illustrating an example of a hardware configuration of a terminal apparatus and a relay apparatus according to an embodiment of the present invention.

FIG. 4A is a diagram illustrating an example of a hardware configuration of the terminal apparatus according to an embodiment. The terminal apparatus 20 includes, for example, a CPU 401, a memory 402, a storage device 403, a wireless communication circuit 404, a sensor I/F 405, a bus 406, and a battery 407.

The CPU 401 is, for example, an arithmetic unit (processor) that implements each function of the terminal apparatus 20 by executing a program stored in a storage medium such as the storage device 403. The memory 402 includes, for example, a RAM used as a work area of the CPU 401 and a ROM for storing a program for starting the CPU 401. The storage device 403 is, for example, a non-volatile, large-capacity storage device for storing programs, apps, and various kinds of data.

The wireless communication circuit 404 includes, by the same wireless communication method as the communication apparatus 10, a wireless circuit for performing wireless communication with the communication apparatus 10, an antenna, a communication control circuit, and the like. The sensor I/F 405 is an interface for connecting various sensors. The sensor connected to the sensor I/F 405 may be provided externally to the terminal apparatus 20 or may be incorporated into the terminal apparatus 20. The bus 406 is connected to each of the above elements in a shared manner and transmits, for example, address signals, data signals, and various control signals.

The battery 407 may be a battery, battery pack, or battery module that supplies power to each of the above elements.

(Hardware Configuration of Relay Apparatus)

Figure 4B:
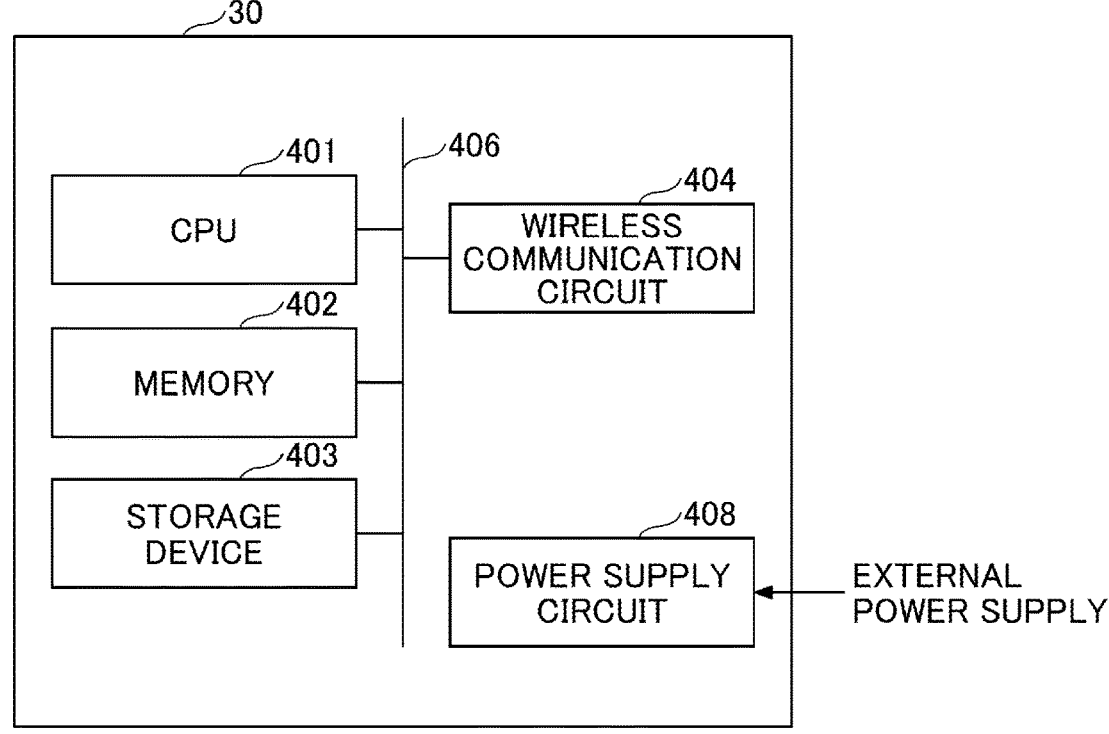

FIG. 4B is a diagram illustrating an example of a hardware configuration of the relay apparatus according to an embodiment. The relay apparatus 30 has a power supply circuit 408 in place of the sensor I/F 405 and the battery 407 in the hardware configuration of the terminal apparatus 20 described in FIG. 4A.

The power supply circuit 408 is a power supply circuit connected to an external power supply, and supplies power to the CPU 401, the memory 402, the storage device 403, the wireless communication circuit 404, the bus 406, and the like included in the relay apparatus 30.

(Hardware Configuration of Management Server)

Figure 5:
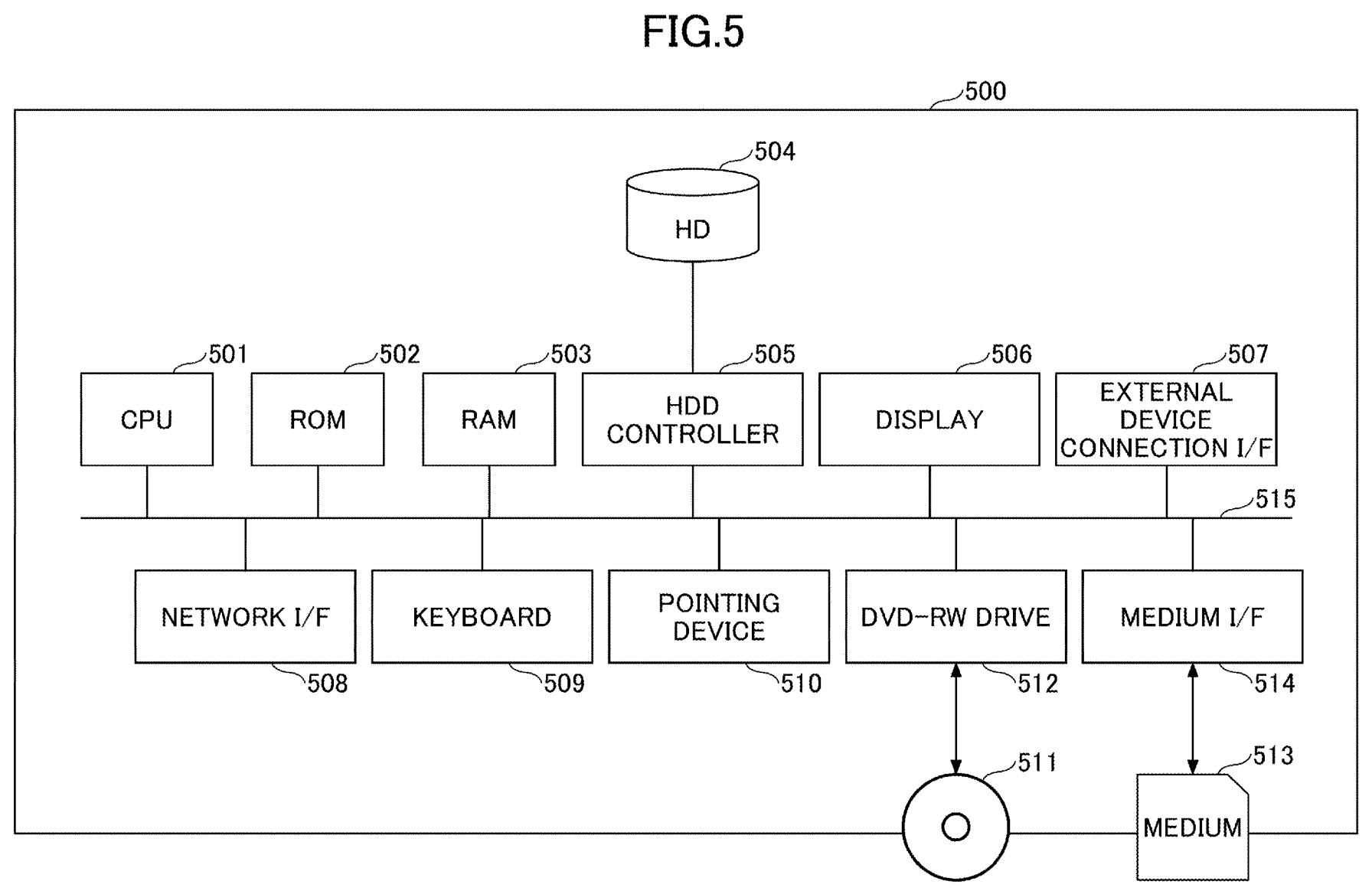

The management server 100 has, for example, a hardware configuration of a computer 500 as illustrated in FIG. 5.

Alternatively, the management server 100 is configured by a plurality of the computers 500.

FIG. 5 is a diagram illustrating an example of a hardware configuration of a computer according to an embodiment. The computer 500 includes, for example, a CPU 501, a ROM 502, a RAM 503, a Hard Disk (HD) 504, an HDD controller 505, a display 506, an external device connection I/F 507, a network I/F 508, a keyboard 509, a pointing device 510, a Digital Versatile Disk Rewritable (DVD-RW) drive 512, a medium I/F 514, and a bus line 515.

Among these, the CPU 501 controls the overall operation of the computer 500. The ROM 502 stores, for example, a program used to start the CPU 501. The RAM 503 is used as a work area or the like of the CPU 501. The HD 504 stores various kinds of data such as programs. The HDD controller 505 controls the reading or writing of various kinds of data from/to the HD 504 under the control of the CPU 501.

The display 506 displays various kinds of information such as cursors, menus, windows, characters, or images. The external device connection I/F 507 is an interface for connecting various external devices. The network I/F 508 is an interface for data communication using the communication network 101.

The keyboard 509 is a type of input means provided with a plurality of keys for inputting characters, numbers, various instructions, etc. The pointing device 510 is a type of input means for selecting and executing various instructions, selecting a processing object, moving a cursor, etc. The DVD-RW drive 512 controls the reading or writing of various kinds of data from/to the DVD-RW 511 as an example of a removable recording medium. The DVD-RW 511 is not limited to the DVD-RW and may be any other recording medium. The medium I/F 514 controls the reading or writing (storage) of data to a medium 513 such as a flash memory. The bus line 515 includes an address bus, a data bus, various control signals, etc., for electrically connecting the above elements.

<Functional Configuration>

Figure 6:
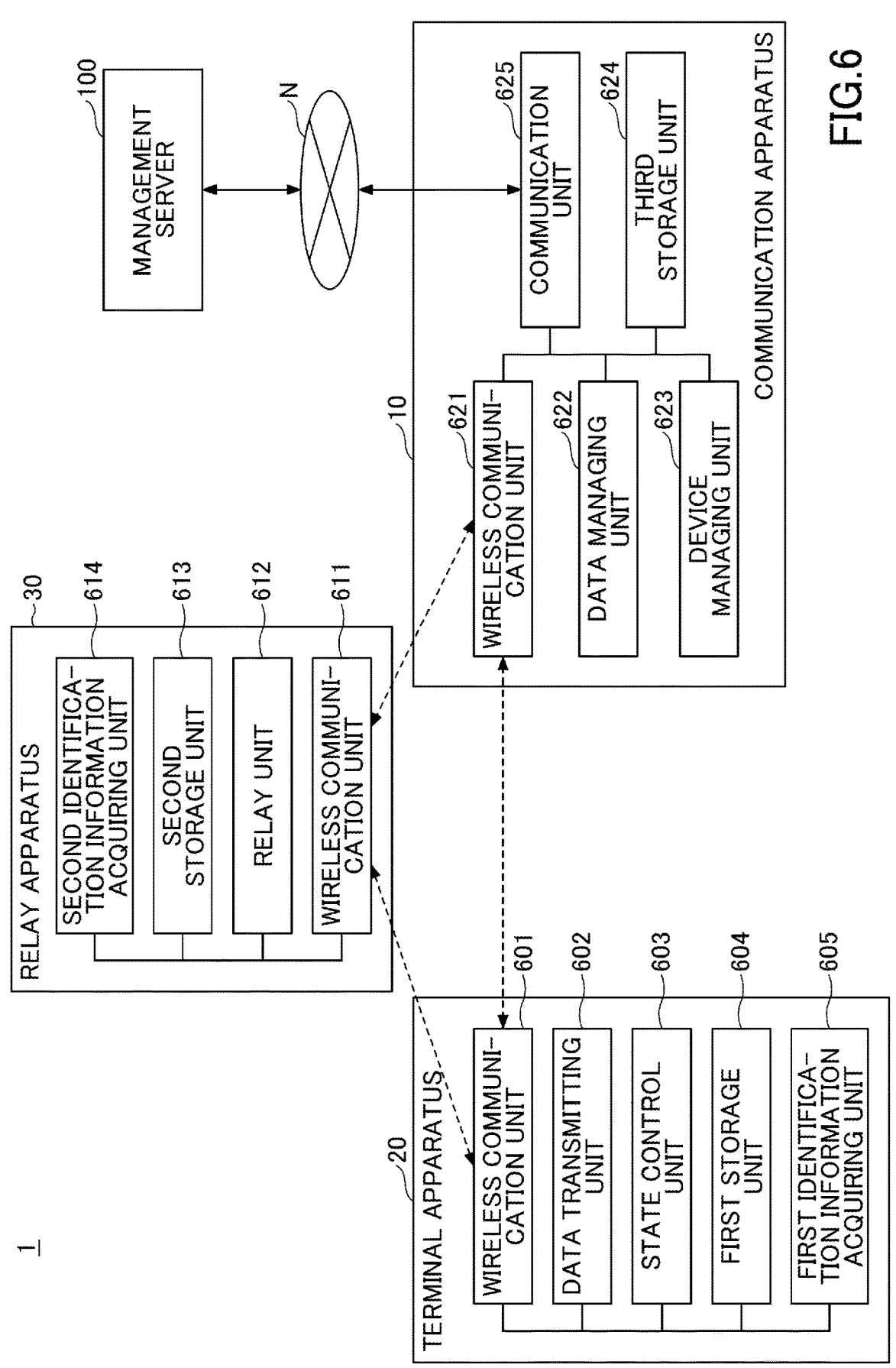
FIG. 6 is a diagram illustrating an example of a functional configuration of a wireless communication system according to an embodiment of the present invention.

FIG. 6 is a diagram illustrating an example of a functional configuration of a wireless communication system according to an embodiment.

(Functional Configuration of Terminal Apparatus)

The terminal apparatus 20 implements, for example, a wireless communication unit 601, a data transmitting unit 602, a state control unit 603, and a first identification information acquiring unit 605 by the CPU 401 executing a program stored in a storage medium such as a storage device 403. At least a part of the above functional configurations may be implemented by hardware.

The terminal apparatus 20 implements a first storage unit 604, for example, by the storage device 403 and the memory 402.

The wireless communication unit 601 executes wireless communication processing for performing wireless communication with the communication apparatus 10 or the relay apparatus 30 by using, for example, the wireless communication circuit 404.

The data transmitting unit 602 executes data transmission processing for transmitting, to the communication apparatus 10, data including the first identification information for identifying the communication apparatus 10 and the second identification information for identifying the terminal apparatus 20. Here, the first identification information is a communication apparatus ID for identifying the communication apparatus 10. The second identification information is a terminal apparatus ID for identifying the terminal apparatus 20.

When the data cannot be transmitted to the communication apparatus 10, the data transmitting unit 602 transmits data including the third identification information for identifying one or more relay apparatuses 30 in the communication network and the second identification information described above. Here, the third identification information is common identification information (hereinafter referred to as a common ID) set in advance for all of the relay apparatuses 30 used in the wireless communication system 1.

The state control unit 603 executes state control processing for controlling the terminal apparatus 20 to be in a regular state in which a regular operation such as wireless communication is possible or to be in a power-saving state (sleep state) in which the wireless communication function is stopped by operating an internal timer.

For example, the state control unit 603 causes the terminal apparatus 20 to shift to a regular state at predetermined time intervals or at a predetermined time. When the state is shifted to a regular state, the data transmitting unit 602 acquires sensor data (an example of data) by using the sensor I/F 405, for example, and transmits the acquired sensor data to the communication apparatus 10 or the relay apparatus 30. When the data transmission is completed, the state control unit 603 causes the terminal apparatus 20 to shift to a power-saving state again.

The first storage unit 604 stores various kinds of data, information, programs, etc., including, for example, the first identification information described above (network ID or communication apparatus ID), the second identification information identifying the terminal apparatus 20 (terminal apparatus ID), and the third identification information (common ID).

The first identification information acquiring unit 605 executes a process of acquiring, from the first storage unit 604 or the like, the first identification information identifying the communication apparatus 10, the second identification information identifying the terminal apparatus 20, and the third identification information identifying one or more relay apparatuses in the communication network.

(Functional Configuration of Relay Apparatus)

The relay apparatus 30 implements, for example, a wireless communication unit 611, a relay unit 612, and a second identification information acquiring unit 614 by the CPU 401 executing a program stored in a storage medium such as a storage device 403. At least a part of the above functional configurations may be implemented by hardware.

The relay apparatus 30 implements a second storage unit 613, for example, by the storage device 403 and the memory 402.

The wireless communication unit 611 executes wireless communication processing for performing wireless communication with the terminal apparatus 20 and the communication apparatus 10, for example, by using the wireless communication circuit 404.

When the relay unit 612 receives data including the third identification information (common ID) and the second identification information (terminal apparatus ID) transmitted by the terminal apparatus 20, the relay unit 612 rewrites the third identification information (common ID) included in the received data with the first identification information (communication apparatus ID) acquired from a second identification information acquiring unit 614 described later, and executes relay processing for transmitting the data to the communication apparatus.

The second storage unit 613 stores various kinds of data, information, programs, etc., including, for example, first identification information (communication apparatus ID), third identification information (common ID), and identification information (hereinafter referred to as a relay apparatus ID) identifying the relay apparatus 30. Preferably, the relay apparatus 30 stores a relay target list which is a list of second identification information (terminal apparatus ID) of the terminal apparatus 20 subject to the relay processing executed by the relay apparatus 30, among the terminal apparatuses 20 included in the wireless communication system 1.

The second identification information acquiring unit 614 executes a process of acquiring the first identification information identifying the communication apparatus 10 from the second storage unit 613 or the like. Preferably, the second identification information acquiring unit 614 acquires a list in which the second identification information of the terminal apparatus 20 subject to relay processing is registered.

The relay unit 612 may execute relay processing when the data received from the terminal apparatus 20 includes the second identification information registered in the list.
(Functional Configuration of Communication Apparatus)

In the communication apparatus 10, a program stored in a storage medium such as the storage device 303 is executed by the CPU 301 to implement, for example, a wireless communication unit 621, a data managing unit 622, a device managing unit 623, and a communication unit 625. At least a part of the above functional configurations may be implemented by hardware.

The communication apparatus 10 implements a third storage unit 624, for example, by the storage device 303 and the memory 302.

The wireless communication unit 621 executes wireless communication processing for performing wireless communication with the terminal apparatus 20 and the relay apparatus 30 by using, for example, the wireless communication circuit 304. For example, the wireless communication unit 621 receives data transmitted by the terminal apparatus 20 from the terminal apparatus 20 or via the relay apparatus 30.

The data managing unit 622 executes data management processing for storing and managing data (e.g., sensor data) received by the wireless communication unit 621 in the third storage unit 624 or the like. The data managing unit 622 transmits data (e.g., sensor data) stored in the third storage unit 624 to the management server 100 in response to a request from the management server 100 or at a predetermined timing, for example.

The device managing unit 623 executes device management processing for managing the terminal apparatus 20, the relay apparatus 30, etc., included in the wireless communication network provided by the communication apparatus 10. For example, in response to a request from the management server 100, the device managing unit 623 sets or changes the setting information of the relay apparatus 30 or the terminal apparatus 20 capable of wireless communication with the communication apparatus 10.

The communication unit 625 connects the communication apparatus 10 to the communication network N by using, for example, the network I/F 305, and executes communication processing for communicating with an external information processing apparatus such as the management server 100.

The third storage unit 624 stores, for example, a network ID for identifying the wireless communication network provided by the communication apparatus 10; a communication apparatus ID for identifying the communication apparatus 10; and data, information, programs, etc., managed by the data managing unit 622 and the device managing unit 623.

(Management Server)

The management server 100 may be a variety of servers, cloud services, or information processing apparatus that utilize or manage the wireless communication system 1 including the communication apparatus 10, the terminal apparatus 20, and the relay apparatus 30. For example, the management server 100 may manage sensor data collected by using the wireless communication system 1. The management server 100 may manage setting information of the communication apparatus 10, the terminal apparatus 20, and the relay apparatus 30 included in the wireless communication system 1. Further, the management server 100 may provide an information processing apparatus capable of communicating via the communication network N with services using sensor data managed by the management server 100 or services for managing the wireless communication system 1.

The functional configuration of the wireless communication system 1 illustrated in FIG. 6 is an example. For example, the communication apparatus 10 may not manage data received from the terminal apparatus 20 or the relay apparatus 30, but may directly transfer the data to the management server 100. The communication apparatus 10 may not manage the terminal apparatus 20 or the relay apparatus 30, but may only relay communication between the management server 100 and the relay apparatus 30 or the terminal apparatus 20.
<Processing Flow>

First Embodiment

Figure 7:
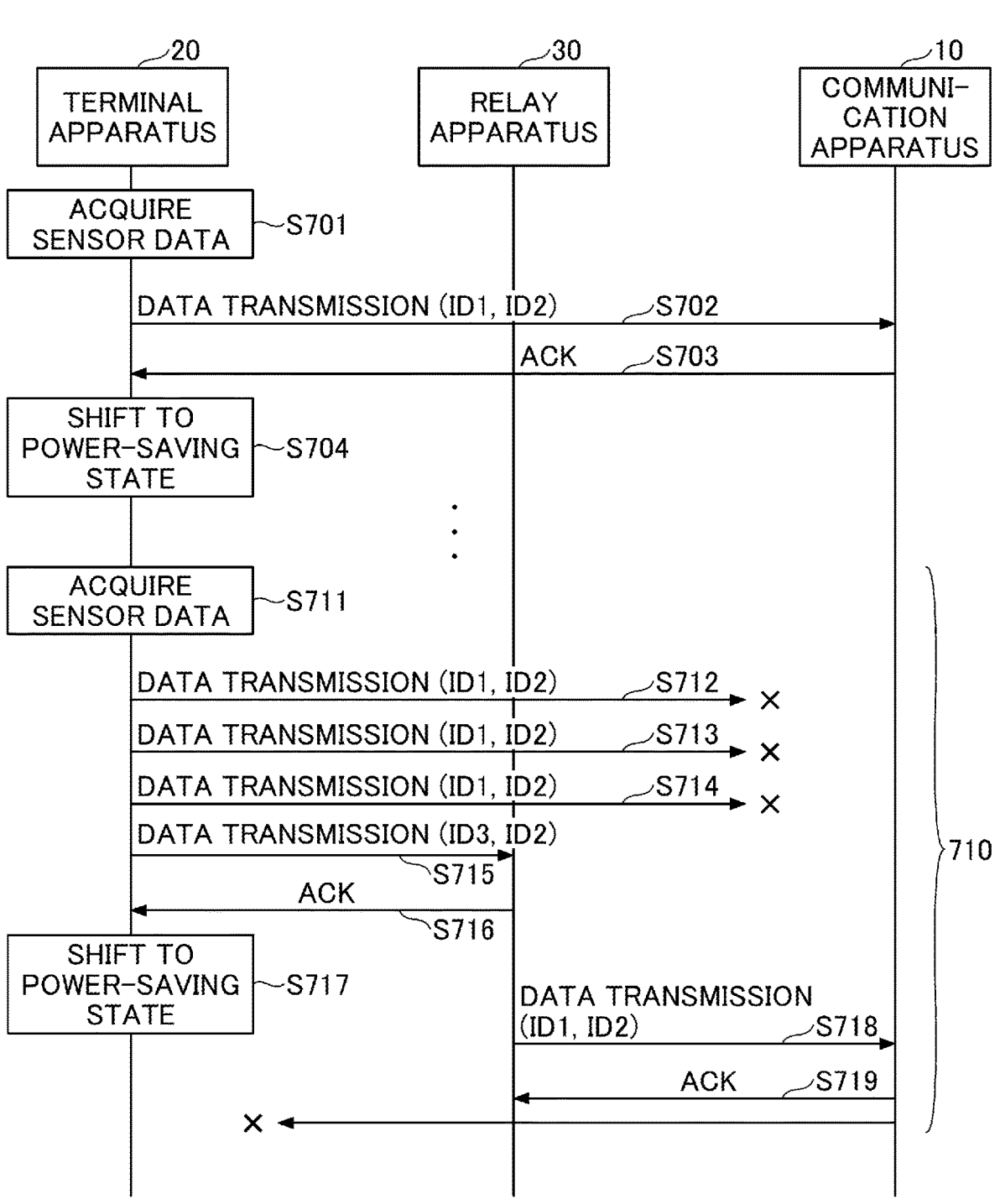
FIG. 7 is a sequence diagram illustrating an example of data transmission processing according to a first embodiment of the present invention.

FIG. 7 is a sequence diagram illustrating an example of data transmission processing according to the first embodiment. This processing indicates, for example, an example of data transmission processing in which the terminal apparatus 20 transmits data such as acquired sensor data to the communication apparatus 10 in the wireless communication system 1 having the functional configuration described in FIG. 6.

In step S701, the terminal apparatus 20 acquires the sensor data. For example, the state control unit 603 of the terminal apparatus 20 causes the terminal apparatus 20 to return to the regular state when a predetermined time elapses after the terminal apparatus 20 shifts to the power-saving state. When the terminal apparatus 20 returns to the regular state, the data transmitting unit 602 of the terminal apparatus 20 acquires sensor data by using the sensor I/F 405.

In step S702, the data transmitting unit 602 of the terminal apparatus 20 transmits the acquired data to the communication apparatus 10. At this time, the data transmitting unit 602 transmits, for example, a data frame 800 illustrated in FIG. 8 to the communication apparatus 10.

Figure 8:
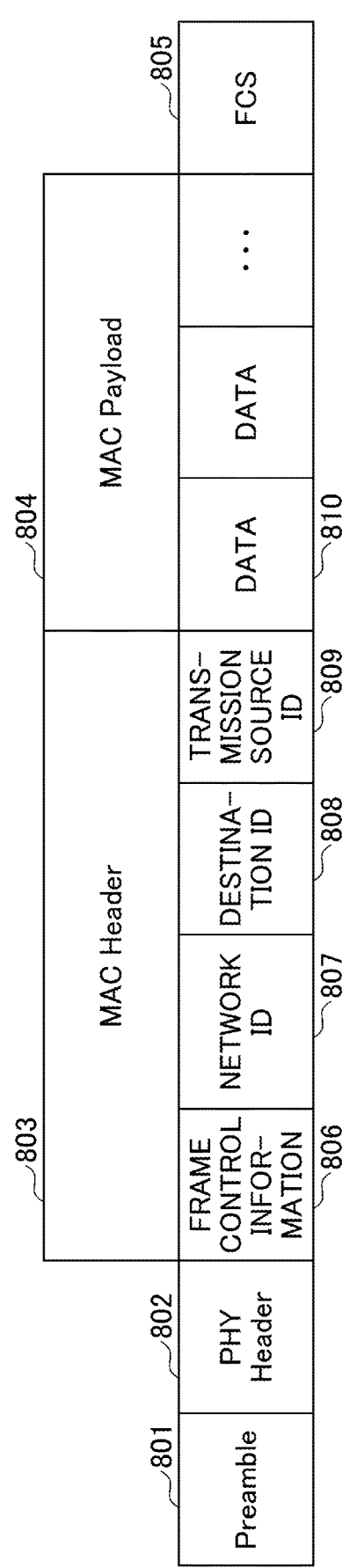
FIG. 8 is a diagram illustrating an example of a configuration of transmission data according to a first embodiment of the present invention.

FIG. 8 is a diagram illustrating a configuration example of transmission data according to the first embodiment. In the example of FIG. 8, the data frame 800 includes a preamble 801, a PHY header 802, a MAC header 803, a Medium Access Control (MAC) payload 804, a Frame Check Sequence (FCS) 805, and the like.

The preamble 801 indicates the start of the data frame 800 and is a synchronization signal for synchronization at the receiver. The PHY header 802 is a header of the physical layer. The MAC header 803 is a header of the MAC layer and includes frame control information 806, a network ID 807, a destination ID 808, a transmission source ID 809, and the like. The MAC payload 804 is a payload of the MAC layer and stores data 810 such as sensor data, for example. The FCS 805 is an error detection code added to detect an error in the data frame 800.

The frame control information 806 is, for example, information defining information relating to the configuration of the MAC header 803 and the MAC payload 804. The network ID 807 is, for example, identification information identifying a wireless communication network provided by the communication apparatus 10. The destination ID 808 is information indicating the destination of the data frame 800. The transmission source ID 809 is information indicating the transmission source of the data frame 800.

For example, in step S702, the data transmitting unit 602 of the terminal apparatus 20 sets the first identification information (ID1) to the destination ID 808, sets the second identification information (ID2) to the transmission source ID 809, and sets the sensor data to the MAC payload 804 in the data frame 800, and transmits the data frame 800. Here, the first identification information (ID1) is the communication apparatus ID of the communication apparatus 10. The second identification information (ID2) is the terminal apparatus ID of the terminal apparatus 20. The data frame 800 is an example of data transmitted by the data transmitting unit 602.

In step S703, when the wireless communication unit 621 of the communication apparatus 10 receives the data from the terminal apparatus 20, the wireless communication unit 621 returns, to the terminal apparatus 20, an ACK (Acknowledgment) indicating that the data has been received. For example, the wireless communication unit 621 transmits an ACK frame to the terminal apparatus 20 that has transmitted the data frame 800. The ACK and the ACK frame are examples of response data.

In step S704, the state control unit 603 of the terminal apparatus 20 causes the terminal apparatus 20 to shift to a power-saving state when the wireless communication unit 601 receives the ACK from the communication apparatus 10.

When the terminal apparatus 20 can perform radio communication with the communication apparatus 10, the wireless communication system 1 repeatedly executes the processes in steps S701 to S704.

On the other hand, when the terminal apparatus 20 cannot perform radio communication with the communication apparatus 10, the wireless communication system 1 executes a process 710 from step S711.

In step S711, the terminal apparatus 20 acquires sensor data in the same manner as in step S701.

In step S712, the data transmitting unit 602 of the terminal apparatus 20 transmits the acquired data to the communication apparatus 10 by using the wireless communication unit 601 in the same manner as in step S702. However, the terminal apparatus 20 cannot perform wireless communication with the communication apparatus 10, and, therefore, the transmitted data does not reach the communication apparatus 10.

In steps S713 and S714, the data transmitting unit 602 of the terminal apparatus 20 may retry the process of transmitting the data to the communication apparatus 10 a predetermined number of times. If the wireless communication unit 601 of the terminal apparatus 20 cannot receive the ACK from the communication apparatus 10 in response to the process in steps S712 to S714, the data transmitting unit 602 determines that the data cannot be transmitted to the communication apparatus 10, for example, and executes the process in step S715.

In step S715, the data transmitting unit 602 of the terminal apparatus 20 transmits data including the third identification information (ID3) and the second identification information (ID2) to one or more relay apparatuses 30. For example, the data transmitting unit 602 sets the third identification information (ID3) to the destination ID 808, sets the second identification information (ID2) to the transmission source ID 809, and sets the sensor data to the MAC payload 804 of the data frame 800, and transmits the data frame 800. Here, the third identification information (ID3) is identification information for identifying one or more relay apparatuses 30 in the communication network, and is a common ID commonly set in advance for all relay apparatuses 30 used in the wireless communication system 1. The second identification information (ID2) is a terminal apparatus ID of the terminal apparatus 20.

In step S716, when the wireless communication unit 611 of the relay apparatus 30 receives data including the third identification information (ID3) and the second identification information (ID2) from the terminal apparatus 20, the wireless communication unit 611 returns an ACK indicating that the data has been received to the terminal apparatus 20. The wireless communication unit 611 is set in advance to receive data including the third identification information (ID3).

In step S717, when the state control unit 603 of the terminal apparatus 20 receives the ACK from the relay apparatus 30, the state control unit 603 causes the terminal apparatus 20 to shift to a power-saving state.

In step S718, when the relay unit 612 of the relay apparatus 30 receives data including the third identification information (ID3) and the second identification information (ID2), the relay unit 612 transmits data including the first identification information (ID1) and the second identification information (ID2) to the communication apparatus 10.

For example, in the data frame 800 transmitted by the terminal apparatus 20, a common ID (third identification information) is set in the destination ID 808, and a terminal apparatus ID (second identification information) of the terminal apparatus 20 is set in the transmission source ID 809. The relay unit 612 rewrites the destination ID 808 of the data frame received from the terminal apparatus 20 with the communication apparatus ID (first identification information) of the communication apparatus 10 previously stored in the second storage unit 613, and transfers the rewritten data frame 800 to the communication apparatus 10.

In step S719, when the wireless communication unit 621 of the communication apparatus 10 receives the data from the relay apparatus 30, the wireless communication unit 621 returns an ACK indicating that the data has been received to the relay apparatus 30. The terminal apparatus 20 does not need to receive the ACK.

By the process illustrated in FIG. 7, the wireless communication system 1 according to the present embodiment can transmit data from the terminal apparatus 20 to the communication apparatus 10 via the relay apparatus 30 without changing the setting of the terminal apparatus 20 that is no longer able to transmit data to the communication apparatus 10.

Moreover, in the first embodiment, for example, the data transmitted by the terminal apparatus 20 to the communication apparatus 10 in step S702 and the data transmitted by the relay apparatus 30 to the communication apparatus 10 in step S718 are the same data, and, therefore, there is no need to make settings or to change the processing of the communication apparatus 10.

Second Embodiment

In the first embodiment, the communication apparatus 10 cannot determine whether the received data is data transmitted by the terminal apparatus 20 or data transmitted by the relay apparatus 30. Therefore, when the relay apparatus 30 receives data including the third identification information (common ID) from the terminal apparatus 20, the relay apparatus 30 may transmit, for example, a data frame 900 illustrated in FIG. 9 to the communication apparatus 10.

Figure 9:
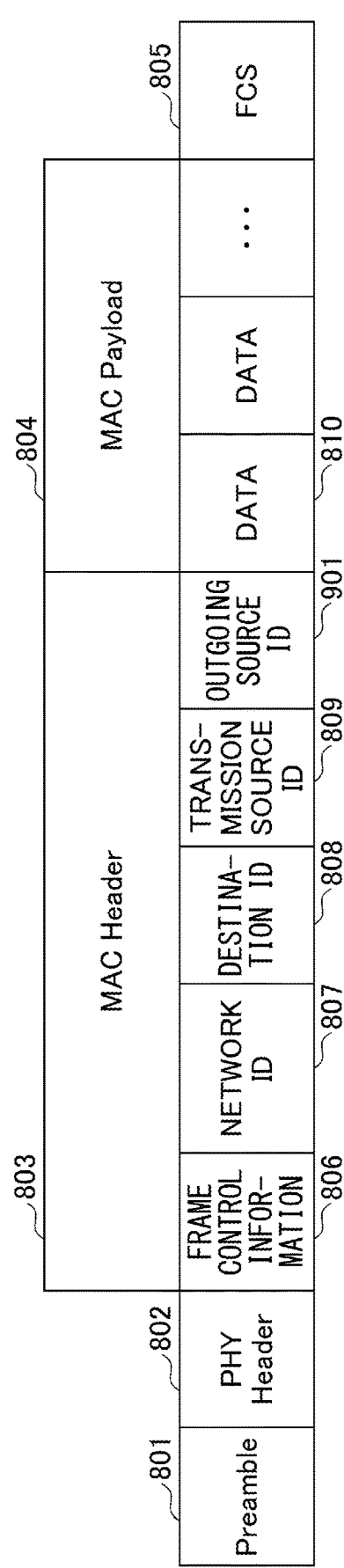
FIG. 9 is a diagram illustrating an example of a configuration of transmission data according to a second embodiment of the present invention.

FIG. 9 is a diagram illustrating a configuration example of transmission data according to the second embodiment. In the data frame 900 according to the second embodiment, an outgoing source ID 901 is added to the data frame 800 according to the first embodiment described in FIG. 8.

When the relay unit 612 according to the second embodiment receives the data frame 800 as illustrated in FIG. 8 from the terminal apparatus 20, the relay unit 612 sets the relay apparatus ID of the relay apparatus to the transmission source ID 809 of the data frame 900, and transmits the data frame 900 in which the outgoing source ID 901 and the terminal apparatus ID of the terminal apparatus 20 are set to the communication apparatus 10.

As the terminal apparatus ID to be set to the outgoing source ID 901 of the data frame 900, the terminal apparatus ID set to the transmission source ID 809 of the received data frame 800 is used. As the data 810 set in the MAC payload 804 of the data frame 900, the data set in the MAC payload 804 of the received data frame 800 is used.

The data frame 900 enables the communication apparatus 10 to determine whether the received data is transmitted by the terminal apparatus 20 or by the relay apparatus 30. When the received data is transmitted by the relay apparatus 30, the communication apparatus 10 can identify the relay apparatus 30 that relayed the data by the relay apparatus ID. The data frame 900 described above is an example of data including the first identification information and the second identification information to be transmitted by the relay unit 612 to the communication apparatus 10. For example, the relay unit 612 may store the received data frame 800 in the MAC payload 804, set the first identification information in the destination ID 808, and transmit, to the communication apparatus 10, another data frame 800 in which the relay apparatus ID is set in the transmission source ID 809.

Third Embodiment

Figure 10:
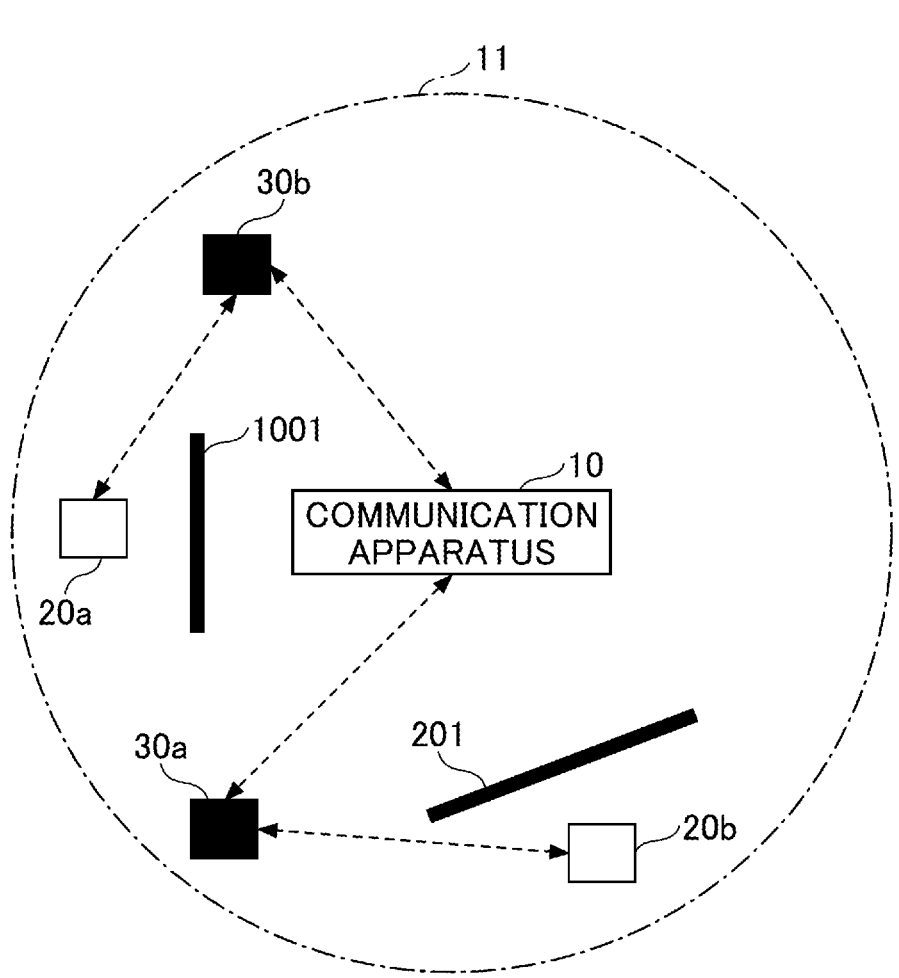
FIG. 10 is a diagram illustrating an example of an arrangement of relay apparatuses according to according to a third embodiment of the present invention.

In the third embodiment, an example of processing when there are a plurality of terminal apparatuses 20 and relay apparatuses 30 will be described. FIG. 10 is a diagram illustrating an example of an arrangement of relay apparatuses according to the third embodiment. In FIG. 10, it is assumed that a radio wave blocking object 201 is installed near the terminal apparatus 20b, and the terminal apparatus 20b cannot transmit data to the communication apparatus 10. In this case, for example, by the same processing as in the first embodiment, the terminal apparatus 20b can transmit data to the communication apparatus 10 via the relay apparatus 30a.

However, if, for example, a new radio wave blocking object 1001 is installed near the terminal apparatus 20a and the relay apparatus 30b is further installed, it is necessary to set whether the relay apparatus 30a or the relay apparatus 30b relays the data transmitted by the terminal apparatus 20a. Therefore, in the relay apparatuses 30a and 30b according to the second embodiment, for example, a relay target list as illustrated in FIGS. 11A and 11B is set.

For example, the relay apparatus 30a stores a relay target list 1101a as illustrated in FIG. 11A in the second storage unit 613. In the relay target list 1101a, a "relay apparatus ID (e.g., "31")" which identifies the relay apparatus 30a, a "common ID (e.g. "30")", and a "relay target terminal apparatus ID (e.g., "22")" are registered. In the "relay target terminal apparatus ID" of the relay target list 1101a, the terminal ID (e.g., "22") of the terminal apparatus (e.g., the terminal apparatus 20b) that is the target of relay by the relay apparatus 30a is registered.

Similarly, the relay apparatus 30b stores a relay target list 1101b as illustrated in FIG. 11B in the second storage unit 613. In the relay target list 1101b, a "relay apparatus ID (e.g., "32")" which identifies the relay apparatus 30b, a "common ID (e.g. "30")", and a "relay target terminal apparatus ID (e.g., "21")" are registered. In the relay target list 1101b, in the "relay target terminal apparatus ID", the terminal ID (e.g., "21") of the terminal apparatus (e.g., the terminal apparatus 20a) to be the target of relay by the relay apparatus 30b is registered.

The relay apparatuses 30a and 30b are operated by an external power source, for example, and are installed in a place where wireless communication with the communication apparatus 10 is possible. Therefore, the administrator or the like who manages the wireless communication system 1 can set the relay target lists 1101a and 1101b by remote control by using, for example, the management server 100.

In the first embodiment, the relay apparatus 30 also has a relay target list, and when the second identification information included in the data received from the terminal apparatus 20 is not included in the relay target list, the data may be ignored (or the relay processing may be stopped).

Figure 12:
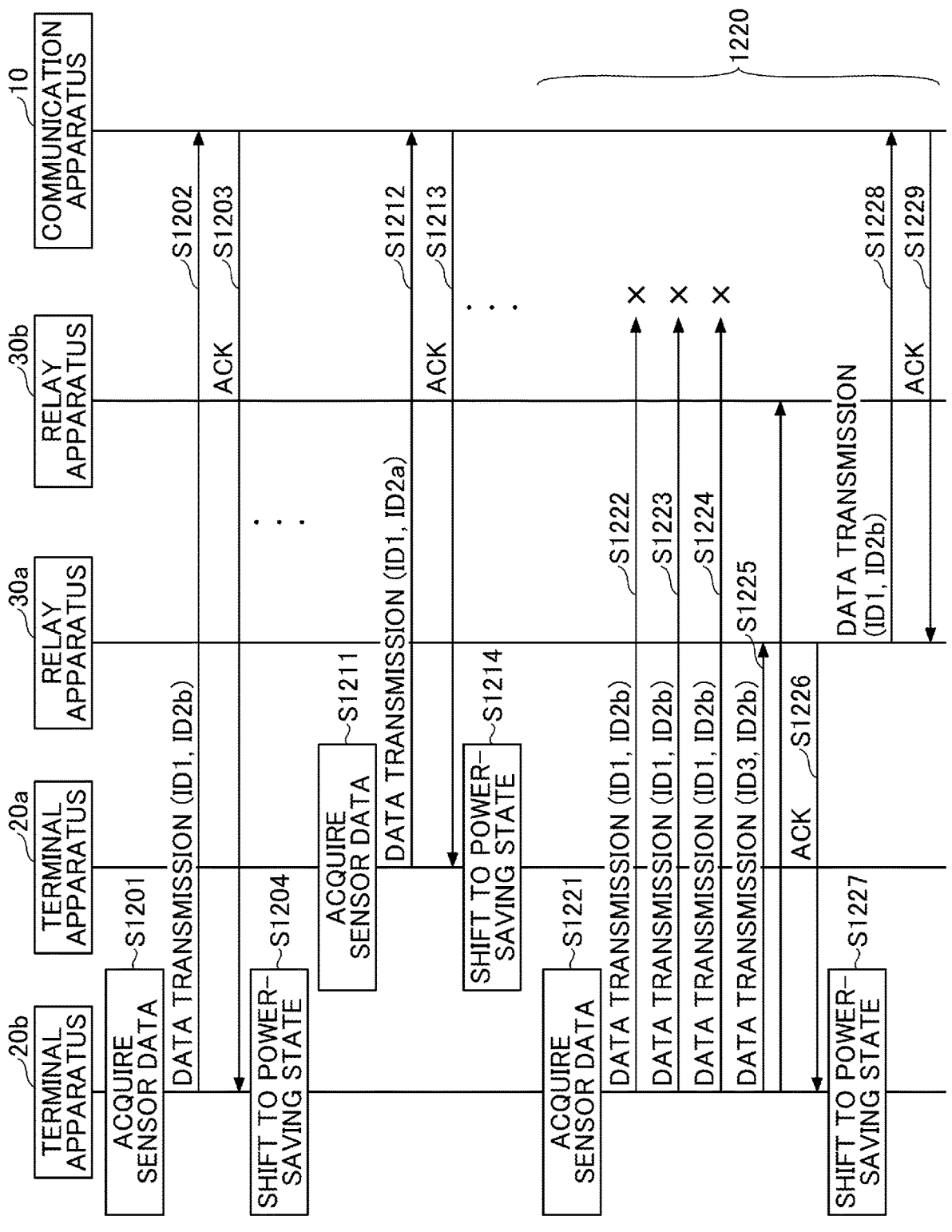
FIG. 12 is a sequence diagram (1) illustrating an example of data transmission processing according to the third embodiment of the present invention.
Figure 13:
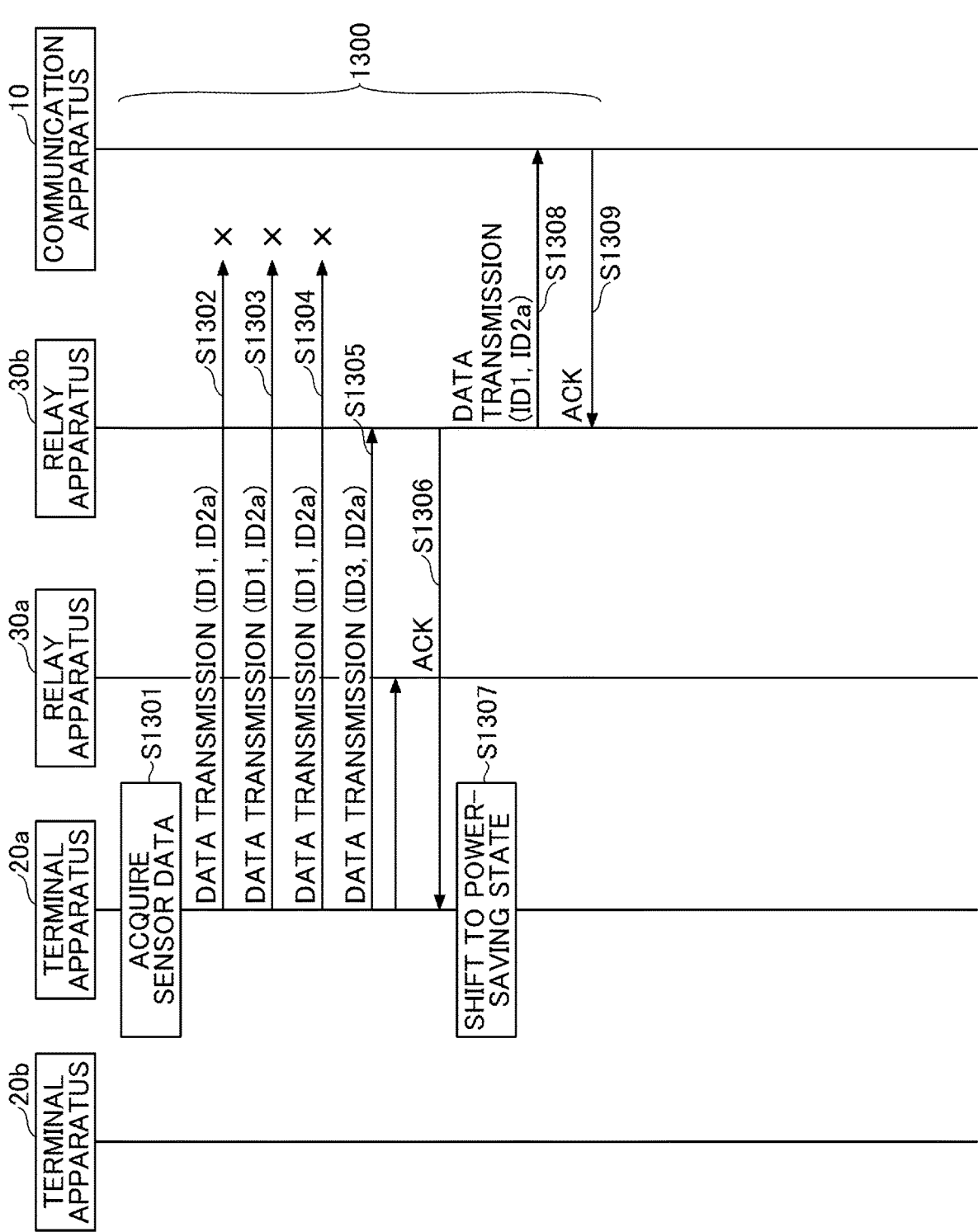
FIG. 13 is a sequence diagram (2) illustrating an example of data transmission processing according to the third embodiment of the present invention.

FIGS. 12 and 13 are sequence diagrams illustrating an example of data transmission processing according to the third embodiment. In this processing, for example, the terminal apparatuses 20a and 20b illustrated in FIG. 10 use the relay apparatuses 30a and 30b to transmit data to the communication apparatus 10. The basic processing contents are the same as the data transmission processing according to the first embodiment described in FIG. 7, and, therefore, a detailed description of the processing contents similar to those of the first embodiment will be omitted here.

In step S1201, the terminal apparatus 20b acquires sensor data in the same manner as the processing in step S701 of FIG. 7. In step S1202, the data transmitting unit 602 of the terminal apparatus 20b transmits data including the first identification information (ID), the second identification information (ID2b), and the acquired sensor data to the communication apparatus 10.

For example, the data transmitting unit 602 of the terminal apparatus 20b sets the first identification information (ID1) to the destination ID 808, sets the second identification information (ID2b) to the transmission source ID 809, and sets the sensor data to the MAC payload 804 of the data frame 800, and transmits the data frame 800. Here, the first identification information (ID1) is the communication apparatus ID of the communication apparatus 10. The second identification information (ID2b) is the terminal apparatus ID of the terminal apparatus 20b.

In step S1203, when the wireless communication unit 621 of the communication apparatus 10 receives the data from the terminal apparatus 20b, the wireless communication unit 621 returns an ACK indicating that the data has been received to the terminal apparatus 20b.

In step S1204, when the wireless communication unit 601 receives the ACK from the communication apparatus 10, the state control unit 603 of the terminal apparatus 20b causes the terminal apparatus 20b to shift to a power-saving state.

When the terminal apparatus 20b is capable of wireless communication with the communication apparatus 10, the wireless communication system 1 repeatedly executes the processes in steps S1201 to S1204.

In step S1211, the terminal apparatus 20a acquires sensor data in the same manner as the process in step S701 in FIG. 7. In step S1212, the data transmitting unit 602 of the terminal apparatus 20a transmits data including the first identification information (ID), the second identification information (ID2a), and the acquired sensor data to the communication apparatus 10.

For example, the data transmitting unit 602 of the terminal apparatus 20a sets the first identification information (ID1) to the destination ID 808, sets the second identification information (ID2a) to the transmission source ID 809, and sets the sensor data to the MAC payload 804 in the data frame 800, and transmits the data frame 800. Here, the second identification information (ID2a) is the terminal apparatus ID of the terminal apparatus 20a.

In step S1213, when the wireless communication unit 621 of the communication apparatus 10 receives data from the terminal apparatus 20a, the wireless communication unit 621 returns an ACK indicating that the data has been received to the terminal apparatus 20a.

In step S1214, when the wireless communication unit 601 receives an ACK from the communication apparatus 10, the state control unit 603 of the terminal apparatus 20a causes the terminal apparatus 20a to shift to a power-saving state.

When the terminal apparatus 20a is capable of wireless communication with the communication apparatus 10, the wireless communication system 1 repeatedly executes the processes in steps S1211 to S1214.

Here, for example, when the terminal apparatus 20b is unable to perform wireless communication with the communication apparatus 10, the wireless communication system 1 executes the process 1220 in steps S1221 to S1229.

In step S1221, the terminal apparatus 20b acquires sensor data in the same manner as in step S1201.

In step S1222, the data transmitting unit 602 of the terminal apparatus 20b transmits the acquired data to the communication apparatus 10 in the same manner as in step S1202. However, the terminal apparatus 20b cannot perform wireless communication with the communication apparatus 10, and, therefore, the transmitted data does not reach the communication apparatus 10.

In steps S1223 and S1224, the data transmitting unit 602 of the terminal apparatus 20b may retry the process of transmitting the data to the communication apparatus 10 a predetermined number of times. If the wireless communication unit 601 of the terminal apparatus 20b cannot receive the ACK from the communication apparatus 10 in response to the process in steps S1222 to S1224, the data transmitting unit 602 determines that the data cannot be transmitted to the communication apparatus 10 and executes the process in step S1225.

In step S1225, the data transmitting unit 602 of the terminal apparatus 20b transmits data including the third identification information (ID3) and the second identification information (ID2b). For example, the data transmitting unit 602 transmits the data frame 800 in which the third identification information (ID=30) is set to the destination ID 808 and the second identification information (ID2b=22) is set to the transmission source ID 809 in the data frame 800.

The data transmitted by the data transmitting unit 602 of the terminal apparatus 20b reaches, for example, the relay apparatuses 30a and 30b. However, the second identification information (ID2b=22) included in the received data is not registered in the relay target list 1101b described in FIG. 11B, and, therefore, the relay apparatus 30b ignores the received data (or stops the relay processing). On the other hand, the second identification information (ID2b=22) included in the received data is registered in the relay target list 1101a described in FIG. 11A, and, therefore, the relay apparatus 30a executes the processing in steps S1226 and S1228.

In step S1226, when the wireless communication unit 611 of the relay apparatus 30a receives the data including the third identification information (ID3) and the second identification information (ID2b), the wireless communication unit 611 returns an ACK indicating that the data has been received to the terminal apparatus 20b.

In step S1227, when the wireless communication unit 601 receives the ACK from the relay apparatus 30a, the state control unit 603 of the terminal apparatus 20b causes the terminal apparatus 20b to shift to a power-saving state.

In step S1228, when the relay unit 612 of the relay apparatus 30a receives data including the third identification information (ID3) and the second identification information (ID2b), the relay unit 612 transmits data including the first identification information (ID1) and the second identification information (ID2b) to the communication apparatus 10.

As another example, the relay unit 612 of the relay apparatus 30a may transmit data including the first identification information (ID1), the second identification information ID2b, and the relay apparatus ID of the relay apparatus 30a to the communication apparatus 10 by applying the second embodiment.

In step S1229, when the wireless communication unit 621 of the communication apparatus 10 receives the data from the relay apparatus 30a, the wireless communication unit 621 returns an ACK indicating that the data has been received to the relay apparatus 30a.

If, for example, the terminal apparatus 20a becomes unable to perform radio communication with the communication apparatus 10, the wireless communication system 1 executes the processing from step S1301 in FIG. 13.

In step S13011, the terminal apparatus 20a acquires sensor data in the same manner as in step S1211.

In step S1302, the data transmitting unit 602 of the terminal apparatus 20a transmits the acquired data to the communication apparatus 10 in the same manner as in step S1212. However, the terminal apparatus 20a cannot perform wireless communication with the communication apparatus 10, and, therefore, the transmitted data does not reach the communication apparatus 10.

In steps S1303 and S1304, the data transmitting unit 602 of the terminal apparatus 20a may retry the process of transmitting the data to the communication apparatus 10 a predetermined number of times. If the wireless communication unit 601 of the terminal apparatus 20a cannot receive the ACK from the communication apparatus 10 in response to the process in steps S1302 to S1304, the data transmitting unit 602 determines that the data cannot be transmitted to the communication apparatus 10 and executes the process in step S1305.

In step S1305, the data transmitting unit 602 of the terminal apparatus 20a transmits data including the third identification information (ID3) and the second identification information (ID2a). For example, the data transmitting unit 602 transmits a data frame 800 in which the third identification information (ID=30) is set to the destination ID 808 and the second identification information (ID2a=21) is set to the transmission source ID 809 in the data frame 800.

The data transmitted by the data transmitting unit 602 of the terminal apparatus 20a reaches, for example, the relay apparatuses 30a and 30b. However, the second identification information (ID2b=21) included in the received data is not registered in the relay target list 1101a described in FIG. 11A, and, therefore, the relay apparatus 30a ignores the received data (or stops the relay processing). On the other hand, the second identification information (ID2b=21) included in the received data is registered in the relay target list 1101b described with reference to FIG. 11B, and, therefore, the relay apparatus 30b executes the processing in steps S1306 and S1308.

In step S1306, when the wireless communication unit 611 of the relay apparatus 30b receives the data including the third identification information (ID3) and the second identification information (ID2a), the wireless communication unit 611 returns an ACK indicating that the data has been received to the terminal apparatus 20b.

In step S1307, when the wireless communication unit 601 receives the ACK from the relay apparatus 30b, the state control unit 603 of the terminal apparatus 20a causes the terminal apparatus 20a to shift to a power-saving state.

In step S1308, when the relay unit 612 of the relay apparatus 30b receives data including the third identification information (ID3) and the second identification information (ID2a), the relay apparatus 30b transmits data including the first identification information (ID1) and the second identification information (ID2a) to the communication apparatus 10.

As another example, the relay unit 612 of the relay apparatus 30b may apply the second embodiment to transmit data including the first identification information (ID1), the second identification information ID2a, and the relay apparatus ID of the relay apparatus 30b to the communication apparatus 10.

In step S1309, when the wireless communication unit 621 of the communication apparatus 10 receives the data from the relay apparatus 30b, the wireless communication unit 621 returns an ACK indicating that the data has been received to the relay apparatus 30b.

By the processing of FIGS. 12 and 13, according to the present embodiment, data can be transmitted from the terminal apparatuses 20a and 20b to the communication apparatus 10 via the plurality of relay apparatuses 30a and 30b without changing the settings of the terminal apparatuses 20a and 20b, which are no longer able to transmit data to the communication apparatus 10.

In the present embodiment, for example, the management server 100 or the like can set, from a remote location or the like, a relay target list in the relay apparatus 30 installed in advance.

According to the wireless communication system 1 according to each embodiment of the present invention, data can be transmitted from the terminal apparatus 20 to the communication apparatus 10 via the relay apparatus 30 without changing the setting of the terminal apparatus 20 which can no longer transmit data to the communication apparatus 10.

<Supplementary Information>

The functions of each of the embodiments described above may be implemented by one or more processing circuits. As used herein, a "processing circuit" includes a processor programmed to execute each function by software such as a processor implemented in an electronic circuit; or devices such as an Application Specific Integrated Circuit (ASIC), a digital signal processor (DSP), a field programmable gate array (FPGA), and a conventional circuit module, designed to execute each function as described above.

In addition, each embodiment of the present invention can be implemented not only as the wireless communication system 1, but also as a wireless communication method in which each of the characteristic processing units provided in the wireless communication system 1 is a step. In addition, each embodiment of the present invention can also be implemented as a program for causing each apparatus included in the wireless communication system 1 function as each of the characteristic processing units provided in the wireless communication system 1. The program can be distributed via a recording medium such as a CD-ROM or a transmission medium such as the Internet.

<Notes>

The present specification discloses the following wireless communication system, relay apparatus, and wireless communication method.

(Note 1)

A wireless communication system includes:

a terminal apparatus configured to transmit data to a communication apparatus via a communication network; and at least one relay apparatus configured to communicate with the communication apparatus and the terminal apparatus by the communication network, wherein the terminal apparatus includes:

a first identification information acquiring unit configured to acquire first identification information identifying the communication apparatus, second identification information identifying the terminal apparatus, and third identification information identifying the at least one relay apparatus in the communication network; and a data transmitting unit configured to transmit the data including the first identification information and the second identification information to the communication apparatus, wherein the data transmitting unit transmits, to the relay apparatus, the data including the third identification information and the second identification information in response to determining that response data, which indicates that the communication apparatus has received the data, is not received from the communication apparatus, and wherein the relay apparatus includes:

a second identification information acquiring unit configured to acquire the first identification information identifying the communication apparatus; and a relay unit configured to perform a relay process to relay the data from the terminal apparatus by rewriting the third identification information included in the data with the acquired first identification information and transmitting the rewritten data to the communication apparatus, in response to receiving the data including the third identification information and the second identification information from the terminal apparatus.

(Note 2)

The wireless communication system according to note 1, wherein the second identification information acquiring unit acquires a list in which the second identification information of the terminal apparatus that is a target of the relaying is registered, and the relay unit executes the relay process in response to determining that the received data includes the second identification information that is registered in the list.

(Note 3)

The wireless communication system according to note 2, wherein the relay unit stops the relay process or ignores the received data, in response to determining that the received data does not include the second identification information that is registered in the list.

(Note 4)

The wireless communication system according to note 2 or 3, wherein the wireless communication system includes a plurality of the relay apparatuses, and the lists acquired by the second identification information acquiring units of the plurality of the relay apparatus are different from each other.

(Note 5)

The wireless communication system according to any one of notes 1 to 4, wherein the relay unit transmits response data to the terminal apparatus corresponding to the second identification information included in the received data, in response to receiving the data including the third identification information and the second identification information.

(Note 6)

The wireless communication system according to note 5, wherein the terminal apparatus further includes a state control unit configure to shift a state of the terminal apparatus to a power-saving state, in response to receiving the response data from the relay unit.

(Note 7)

A relay apparatus capable of communicating, by a communication network, with a terminal apparatus configured to transmit data to a communication apparatus via the communication network, and with the communication apparatus, the relay apparatus including:

a receiving unit configured to receive, from the terminal apparatus, the data including third identification information identifying the relay apparatus and second identification information identifying the terminal apparatus, the received data being transmitted to the relay apparatus from the terminal apparatus in a case where the terminal apparatus acquires first identification information identifying the communication apparatus, the second identification information, and the third identification information, and the terminal apparatus transmits, to the communication apparatus, the data including the first identification information and the second identification information, but the terminal apparatus does not receive, from the communication apparatus, response data indicating that the communication apparatus has received the data from the terminal apparatus;

an identification information acquiring unit configured to acquire the first identification information identifying the communication apparatus; and a relay unit configured to perform a relay process to relay the data from the terminal apparatus by rewriting the third identification information included in the data with the acquired first identification information and transmitting the rewritten data to the communication apparatus, in response to receiving the data including the third identification information and the second identification information from the terminal apparatus.

(Note 8)

A program configured to cause a relay apparatus, which is capable of communicating, by a communication network, with a terminal apparatus configured to transmit data to a communication apparatus via the communication network, and with the communication apparatus, as the following units:

a receiving unit configured to receive, from the terminal apparatus, the data including third identification information identifying the relay apparatus and second identification information identifying the terminal apparatus, the received data being transmitted by the terminal apparatus when the terminal apparatus does not receive, from the communication apparatus, response data indicating that the communication apparatus has received the data from the terminal apparatus after the terminal apparatus transmits, to the communication apparatus, the data including first identification information identifying the communication apparatus and the second identification information;

an identification information acquiring unit configured to acquire the first identification information identifying the communication apparatus; and a relay unit configured to perform a relay process to relay the data from the terminal apparatus by rewriting the third identification information included in the data with the acquired first identification information and transmitting the rewritten data to the communication apparatus, in response to receiving the data including the third identification information and the second identification information from the terminal apparatus.

(Note 9)

A wireless communication method executed by a wireless communication system including a terminal apparatus configured to transmit data to a communication apparatus via a communication network, and at least one relay apparatus configured to communicate with the communication apparatus and the terminal apparatus by the communication network, the wireless communication method including:

acquiring, by the terminal apparatus, first identification information identifying the communication apparatus, second identification information identifying the terminal apparatus, and third identification information identifying the at least one relay apparatus in the communication network;

transmitting, by the terminal apparatus, the data including the first identification information and the second identification information to the communication apparatus;

transmitting, by the terminal apparatus to the relay apparatus, the data including the third identification information and the second identification information in response to determining that response data, which indicates that the communication apparatus has received the data, is not received from the communication apparatus;

acquiring, by the relay apparatus, the first identification information identifying the communication apparatus; and relaying, by the relay apparatus, the data from the terminal apparatus by rewriting the third identification information included in the data with the acquired first identification information and transmitting the rewritten data to the communication apparatus, in response to receiving the data including the third identification information and the second identification information from the terminal apparatus.

According to an embodiment of the present invention, data can be transmitted from the terminal apparatus to the communication apparatus via the relay apparatus without changing the setting of the terminal apparatus which can no longer transmit data to the communication apparatus.

The wireless communication system, the relay apparatus, and the wireless communication method are not limited to the specific embodiments described in the detailed description, and variations and modifications may be made without departing from the spirit and scope of the present invention.

What is claimed is:

1. A wireless communication system comprising:

a terminal apparatus configured to transmit data to a communication apparatus via a communication network; and at least one relay apparatus configured to communicate with the communication apparatus and the terminal apparatus by the communication network, wherein the terminal apparatus includes:

first circuitry; and a first memory storing computer-executable instructions that cause the first circuitry to execute:

acquiring first identification information identifying the communication apparatus, second identification information identifying the terminal apparatus, and third identification information identifying the at least one relay apparatus in the communication network; and transmitting the data including the first identification information and the second identification information to the communication apparatus, wherein the transmitting includes transmitting, to the relay apparatus, the data including the third identification information and the second identification information in response to determining that response data is not received from the communication apparatus, the response data being data indicating that the communication apparatus has received the data, and wherein the relay apparatus includes:

second circuitry; and a second memory storing computer-executable instructions that cause the second circuitry to execute:

acquiring the first identification information identifying the communication apparatus; and relaying the data from the terminal apparatus by rewriting the third identification information included in the data with the acquired first identification information and transmitting the rewritten data to the communication apparatus, in response to receiving the data including the third identification information and the second identification information from the terminal apparatus.

2. The wireless communication system according to claim 1, wherein the acquiring by the second circuitry of the relay apparatus includes acquiring a list in which the second identification information of the terminal apparatus that is a target of the relaying is registered, and the relaying by the second circuitry of the relay apparatus includes relaying the data in response to determining that the received data includes the second identification information that is registered in the list.

3. The wireless communication system according to claim 2, wherein the relaying by the second circuitry of the relay apparatus includes stopping the relaying or disregarding the received data, in response to determining that the received data does not include the second identification information that is registered in the list.

4. The wireless communication system according to claim 2, wherein the wireless communication system includes a plurality of the relay apparatuses, and the lists acquired at the acquiring by the second circuitry of the plurality of the relay apparatus are different from each other.

5. The wireless communication system according to claim 1, wherein the relaying by the second circuitry of the relay apparatus includes transmitting response data to the terminal apparatus corresponding to the second identification information included in the received data, in response to receiving the data including the third identification information and the second identification information.

6. The wireless communication system according to claim 5, wherein the first circuitry of the terminal apparatus is further caused to execute:

shifting a state of the terminal apparatus to a power-saving state, in response to receiving the response data from the relay apparatus.

7. A relay apparatus capable of communicating, by a communication network, with a terminal apparatus configured to transmit data to a communication apparatus via the communication network, and with the communication apparatus, the relay apparatus comprising:

circuitry; and a memory storing computer-executable instructions that cause the circuitry to execute:

receiving, from the terminal apparatus, the data including third identification information identifying the relay apparatus and second identification information identifying the terminal apparatus, the received data being transmitted to the relay apparatus from the terminal apparatus in a case where the terminal apparatus acquires first identification information identifying the communication apparatus, the second identification information, and the third identification information, and the terminal apparatus transmits, to the communication apparatus, the data including the first identification information and the second identification information, in response to determining that the terminal apparatus does not receive, from the communication apparatus, response data indicating that the communication apparatus has received the data from the terminal apparatus;

acquiring the first identification information identifying the communication apparatus; and relaying the data from the terminal apparatus by rewriting the third identification information included in the data with the acquired first identification information and transmitting the rewritten data to the communication apparatus, in response to receiving the data including the third identification information and the second identification information from the terminal apparatus.

8. A wireless communication method executed by a wireless communication system including a terminal apparatus configured to transmit data to a communication apparatus via a communication network, and at least one relay apparatus configured to communicate with the communication apparatus and the terminal apparatus by the communication network, the wireless communication method comprising:

acquiring, by the terminal apparatus, first identification information identifying the communication apparatus, second identification information identifying the terminal apparatus, and third identification information identifying the at least one relay apparatus in the communication network;

transmitting, by the terminal apparatus, the data including the first identification information and the second identification information to the communication apparatus;

transmitting, by the terminal apparatus to the relay apparatus, the data including the third identification information and the second identification information in response to determining that response data is not received from the communication apparatus, the response data being data indicating that the communication apparatus has received the data;

acquiring, by the relay apparatus, the first identification information identifying the communication apparatus; and relaying, by the relay apparatus, the data from the terminal apparatus by rewriting the third identification information included in the data with the acquired first identification information and transmitting the rewritten data to the communication apparatus, in response to receiving the data including the third identification information and the second identification information from the terminal apparatus.

* * * * *